United States Patent [19]
Kampf et al.

[11] 3,966,697
[45] June 29, 1976

[54] PRODUCTION OF HIGH-VINYL GROUP, HIGH-MOLECULAR WEIGHT UNSATURATED HYDROCARBON POLYMERS

[75] Inventors: Wolfgang Kampf, Haltern; Karl-Heinz Nordsiek, Marl, both of Germany

[73] Assignee: Chemische Werke Huls Aktiengesellschaft, Marl, Germany

[22] Filed: Dec. 9, 1974

[21] Appl. No.: 530,550

[30] Foreign Application Priority Data
Oct. 3, 1974  Germany............................ 2447203

[52] U.S. Cl............................. 526/93; 252/431 R; 252/431 C; 252/431 P; 526/139; 526/159; 526/193; 526/213; 526/335
[51] Int. Cl.²...................... C08F 4/70; C08F 36/06
[58] Field of Search ........ 252/429 B, 431 R, 431 C; 260/94.3

[56] References Cited
UNITED STATES PATENTS

| | | | |
|---|---|---|---|
| 3,040,016 | 6/1962 | Balas.................................. | 260/94.3 |
| 3,066,127 | 11/1962 | Carlson et al...................... | 260/94.3 |
| 3,111,510 | 11/1963 | Balas.................................. | 260/94.3 |
| 3,502,637 | 3/1970 | Marullo et al...................... | 260/94.3 |

*Primary Examiner*—Edward J. Smith
*Attorney, Agent, or Firm*—Millen, Raptes & White

[57] ABSTRACT

High molecular weight polybutadiene, polyisoprene and other hydrocarbon polymers having a high vinyl and a low 1,4-trans-double bond content, which are useful in the manufacture of tire treads and carcasses, are produced employing as catalyst system (a) a cobalt compound; (b) a halogen-containing organoaluminum compound; and (c) a tris-(aryl) phosphite of the formula $P-(OR_1), (-OR_2), -OR_3$ wherein $R_1$, $R_2$ and $R_3$ are monocyclic halogenated aryl, or diaryl, naphthyl, anthracenyl or phenanthryl or the corresponding halogenated and/or alkylated polycyclic aryl; and optionally (d) an H-acidic compound, e.g., water.

13 Claims, No Drawings ple. However, the low molecular polymers produced by this process cannot be utilized as rubbers.

It is an object of this invention to overcome the above-described disadvantages.

PRODUCTION OF HIGH-VINYL GROUP, HIGH-MOLECULAR WEIGHT UNSATURATED HYDROCARBON POLYMERS

BACKGROUND OF THE INVENTION

This invention relates to a process for the production of high molecular weight unsaturated hydrocarbon polymers having an increased proportion of vinyl groups or substituted vinyl groups, respectively.

Unsaturated hydrocarbon polymers, especially polybutadienes, are valuable basic materials, the low-molecular weight polymers being used primarily in the varnish and impregnating field, and the higher-molecular weight polymers being especially useful as rubbers. As is known, the properties of the polymers are greatly dependent on the steric configuration of the double bonds in the polymer. In detail, a differentiation is made among 1,4-cis-, 1,4-trans- and 1,2- or vinyl-double bonds.

Several processes have been known for the production of low-molecular polybutadienes with a high (>95%) 1,4-content and molecular weights of 500 to 50,000 (German Pat. Nos. 1,186,631; 1,241,119; and 1,292,853). The products obtained according to these prior-art processes are, however, not suitable for all purposes, due to their high 1,4-content. There is a real need for products having an increased proportion of vinyl groups.

It is known from German published application DOS No. 1,720,998 to produce 1,2-polybutadiene having a high percentage of vinyl configuration, by polymerizing butadiene in a halogenated hydrocarbon as the solvent with a catalyst containing as the essential component organic phosphines of the general formula PR'R''R''', wherein R' and R'' are alkyl groups and R''' is an alkyl or aryl group. However, this process is burdened with deficiencies. On the one hand, the halogenated hydrocarbons, which represent the only solvent usable in this method, are very toxic. On the other hand, the phosphines are very expensive and moreover make it impossible to produce high molecular weight polymers having vinyl contents in the range of interest in rubber technology, viz., between 10% and 70% 1,2-content.

German patent application No. P 23 61 782.5 describes a process for the production of low-molecular unsaturated hydrocarbon polymers having an increased proportion of vinyl and/or substituted vinyl groups, which in part eliminates some of the disadvantages of the relevant state of the art. That process is characterized by polymerizing conjugated dienes, optionally in the presence of a solvent, employing a catalyst system consisting essentially of (a) a cobalt compound, (b) a halogen-containing organoaluminum compound, (c) an organic phosphorus compound, and optionally (d) an H-acidic compound, wherein the catalyst component (c) is an organic phosphorus compound of the general formula

wherein $R_1$, $R_2$ and $R_3$ can be an aryl or alkenyl group, or a general group $OR_4$, $OR_5$ or $OR_6$, wherein $R_4$, $R_5$ and $R_6$ signify an alkyl, alkenyl or monocyclic aryl.

SUMMARY OF THE INVENTION

According to this invention, high-molecular weight rubber-like unsaturated hydrocarbon polymers having an increased proportion of vinyl groups or substituted vinyl groups, respectively, can be produced in a simple and economical manner by the polymerization of conjugated dienes, in the presence of a solvent, employing as the catalyst system:
 a. a cobalt compound,
 b. a halogen-containing organoaluminum compound, and
 c. an organic phosphorus compound, wherein catalyst component (c) is one or more tris-(aryl) phosphites of the general formula

wherein $R_1$, $R_2$ and $R_3$ are alike or different and are halogenated monocyclic aryl, or diaryl, naphthyl, anthracenyl or phenanthryl or a corresponding halogenated, alkylated or halogenated and alkylated polycyclic aryl and optionally wherein the catalyst system contains as a further catalyst component
 d. an H-acidic compound.

DETAILED DISCUSSION

In the process of this invention, preferably produced are high-molecular polybutadienes having a vinyl group proportion of up to about 85%, preferably 10–75%, and polyisoprenes having a proportion of isopropenyl groups of up to 50%, preferably 10–45%, both with correspondingly low contents of 1,4-trans-double bonds. However, other conjugated dienes can likewise be polymerized in accordance with this process, such as, for example, 1,3-pentadiene, 1,3-hexadiene, 1,3-heptadiene, 1,3-octadiene, 1,3,6-n-octatriene, 1,3,7-n-octatriene, 4-methyl-1,3-pentadiene, 3-methyl-1,3-pentadiene, 3-methyl-1,3-hexadiene, 4-methyl-1,3-hexadiene, 3,7-dimethyl-1,3-octadiene and 5-methyl-1,3,6-heptatriene.

In this process, organic phosphites of the above general formula are utilized as component (c) of the catalyst system. Examples of suitable phosphites are halogenated trisaryl phosphites, e.g., wherein the halogen atom(s) is Cl or Br or both. Also operable are unsubstituted polycyclic tris(aryl)phosphites, e.g., diphenyl, naphthyl, anthracenyl and phenanthryl.

Of the polycyclic aryl groups, preferred are those having up to three fused benzene rings, which can be unsubstituted, halogenated and/or alkylated. Halogenated monocyclic tris(aryl)phosphites are also operable. Of the aryl groups, preferred are those which are mono-, di-, or trihalosubstituted.

Examples of halogenated aryl are chlorophenyl, bromophenyl, chloro, bromophenyl, dichlorophenyl, dibromophenyl, trichlorophenyl, chlorodibromophenyl and dichlorobromophenyl.

Examples of diaryl are diphenyl and chlorophenylphenyl, chlorophenylchlorophenyl and bromophenylphenyl.

Other examples of polycyclic aryl are naphthyl, anthracenyl, phenanthryl and the corresponding fused benzene ring systems bearing 1, 2 or 3 halo, e.g., chloro, and/or alkyl, e.g., methyl, groups.

Examples of the tris(aryl)phosphites which can be employed in the catalyst system of this invention are tris(o-phenylphenyl)-, tris(1-naphthyl)-, tris(2-naphthyl)-, tris(2-chlorophenyl)-, tris(2,4,6-trichlorophenyl)-, tris(2-bromophenyl)- and tris(2,4,6-tribromophenyl)phosphites. Preferred are tris(naphthyl)-phosphites, as well as tris(o-phenylphenyl)-phosphite.

Optionally, the catalyst system contains an H-acidic compound, such as, for example, water, alcohol or an organic acid, i.e., a Bronsted acid. Water is preferred.

The other components of the catalyst system employed in the process of the present invention are (a) a cobalt compound and (b) a halogen-containing organoaluminum compound.

Examples of suitable cobalt compounds are salts of inorganic or organic acids, as well as complex compounds of cobalt, e.g., cobalt chloride, cobalt bromide, cobalt iodide, cobalt sulfate, cobalt sulfide, cobalt nitrate, cobalt carbonate, cobalt phosphate, cobalt cyanate, cobalt cyanide, cobalt hydroxide, cobalt acetate, cobalt oxalate, cobalt valerate, cobalt octoate, cobalt naphthenate, cobalt stearate, cobalt tris- and bis-acetylacetonate, cobalt bis-acetoacetate and dicyclopentadienylcobalt. Examples of other equivalent cobalt compounds will be apparent to those skilled in the art. Preferably, cobalt compounds which are soluble in organic solvents are utilized, for example, cobalt octoate, cobalt acetylacetonate and mixtures thereof.

Examples of preferred halogen-containing organoaluminum compounds are dialkyl aluminum halides, preferably chloride or bromide, e.g., dimethylaluminum chloride, diethylaluminum chloride and diisobutylaluminum chloride and other dialkylaluminum halides of 1–6 C-atoms in each alkyl group.

The cobalt compound is utilized in catalytic amounts, e.g., 0.001 to 1 millimole, preferably 0.01 to 0.5 millimole, per mole of monomer to be polymerized.

The mixture proportions of the catalyst components can be selected arbitrarily in correspondence with the types of components, the polymerization conditions, and the properties of the polymer to be produced. However, the molar ratio of cobalt to the aluminum in (b) in the catalyst system is 1:1 to 1:2,000, preferably 1:10 to 1:100.

The proportion of the organic phosphorus compound in the catalyst system generally is in the range from 0.1 to 50 moles, preferably 0.2 to 20 moles, per mole of the cobalt compound.

Finally, the molar ratio of the optional H-acidic compound to the aluminum in (b) can be up to 1.5 : 1.

A particular advantage of the catalyst system of this process is that no aging treatment is required prior to its use.

The process of this invention can be carried out continuously or batchwise by contacting the conjugated dienes in contact with the above-described catalyst in a hydrocarbon solvent or a halogenated hydrocarbon solvent. The maximum monomer concentration is determined by the viscosity of the polymer solution.

Suitable solvents are those basically known in the polymerization with the aid of Ziegler-Natta catalysts. The most important representatives of the group of aliphatic, alicyclic, aromatic and halogenated hydrocarbons are pentane, hexane, heptane, n- and isooctane, isononane (hydrogenated trimer propene), n-decane, isododecane (hydrogenated tetramer propene), cyclopentane, cyclohexane and the substitution products thereof, methylcyclopentane, methylcyclohexane, ethylcyclohexane, isopropylcyclohexane, cyclooctane, decahydronaphthalene, hydrogenated terpenes, such as pinane and camphane, benzene, toluene, o-, m- and p-xylene, ethylbenzene, o-, m- and p-diethylbenzene, n-propylbenzene, isopropylbenzene and other mono- to polyalkyl benzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene, 1,2-dichloroethane.

However, in view of the polymerization activity, an aromatic hydrocarbon, e.g., benzene, is preferred as the solvent.

The process of this invention is generally conducted at temperatures of −20° to +100° C., preferably 0° to 80° C.

There is no limitation with respect to pressure employed during the polymerization step, as long as it is sufficient to maintain the reaction mixture, especially the monomer to be polymerized, in the liquid phase.

The polymerization is short-stopped after the desired reaction period by allowing the polymer solution to flow into a mixture of isopropanol and stabilizer solution. A suitable stabilizer is, for example, phenyl-β-naphthylamine in a benzene solution. The thus-obtained inactivated, stabilized polymer solution is worked up either by precipitation into isopropanol, wherein the polymer solution is poured into strongly agitated, excesss precipitant, or by driving off the solvent with steam. Thereafter, the polymer is dried under vacuum.

As mentioned above, the hydrocarbon polymers produced according to the process of this invention are characterized by an increased proportion of vinyl or substituted vinyl groups. Thus, e.g., polybutadienes are obtained with a vinyl group content of up to 85%, preferably 10–75%, and polyisoprenes are produced with a content of isopropenyl groups of up to 50%, preferably 10–45%, with a respectively low content of 1,4-trans-double bonds. The proportion of the vinyl or substituted vinyl groups can be controlled by the concentration of the organic phosphorus compound and/or the molar ratio of phosphorus compound to cobalt compound. For example inincreasing the P-concentration increases the percentage of vinyl groups and decreases the molecular weight.

The products obtained according to the process of this invention, primarily the thus-obtained polybutadienes, exhibit generally the following distribution of double bonds:

| | |
|---|---|
| vinyl double bonds | 10 – 85% |
| 1,4-cis-double bonds | 15 – 90% |
| 1,4-trans-double bonds | 0 – 10% |

The molecular weight distributions of the polymers are very greatly dependent on the temperature and rise with higher temperatures.

At 50° C., molecular weight distribution U-values of between 3.5 and 4 are obtained. Special advantages during the processing of the polymers are realized by this wide molecular weight distribution.

With the possibility of a thus-provided, wide-range adjustability of molecular weight distribution, the processing properties are controllable as desired within a broad range. This is a factor which has gained ever-increasing importance in view of the growing automation in the field of the rubber processing industry. The molecular weight increases with decreasing temperature. Interesting molecular weights range for the rubber is in the region of 50,000–400,000. A product with RSV 1.7 dl/g, produced at 50°C, is increasing in the RSV by processing at 30°C to values about 2.7 dl/g.

The products manufactured according to the process of this invention are suitable for many technical purposes, especially as rubber materials, for example for the manufacture of passenger automobile tire treads, which has a desired effect upon abrasion-skid behavior [cf. K. H. Nordsiek, "Kautschuk und Gummi", 25 (3), p. 87 (1972)].

The treads of pneumatic tires for motor vehicles are vulcanisation products of rubber blends containing large quantities of oil and carbon black. The rubber blends at present principally used for this purpose are mixtures of copolymers obtained by emulsion or solution polymerization of butadiene and styrene with stereoregular polydiolefins, particularly cis-1,4-polybutadiene. The blending proportions are usually between 80 : 20 and 50 : 50. If the quantity of the stereospecific polydiolefins is raised the wear resistance of the tires improves, but its grip on wet surfaces becomes poorer. In tires production this necessarily means that in practice a compromise must be adopted.

Besides their above-mentioned poor adhesion to wet surfaces, treads made exclusively of homopolybutadiene have another drawback which stands in the way of producing them only from these hitherto conventional polymers, viz., their processing properties are unsatisfactory. For achieving optimum properties in the absence of suitable polymers which offer an acceptable compromise, it has therefore always been necessary to use blends and to adapt the composition of these blends to the contemplated needs. However, the use of blends involves the employment of economically expensive manufacturing methods. Difficulties also arise because homogeneous distributions of the components of the blend which differ in chemical constitution are often not easy to attain.

In view of the cost of producing these blends there is considerable industrial interest in the development of polymers that are capable of satisfying every requirement by possessing properties that will optimally comply with the above described compromise, and that will at the same time offer technical as well as primarily economical advantages in production and subsequent processing. The products of the invention make it possible now to eliminate the use of blends made up of emulsion SBR and cis-1,4-polybutadiene, generally employed today in tire technology, which practice is not without problems in view of the required homogeneity of the individual components. In general, the butadiene-homopolymers of this invention make it possible to adjust the properties of a large number of blends. The necessity of using styrene as a monomer component, which is becoming more difficult to obtain and more expensive, is thus obviated in a simple manner. However, the present polymers are also ideally suitable for the manufacture of other important tire parts, such as carcasses, sidewalls, belting layers and tire bases, as "made-to-order" products by an appropriate adjustment of molecular structure. Moreover, the products of this invention can be used advantageously for the production of other mass-produced molded and extruded articles, especially those wherein an accurate adjustment of the dynamic properties or the damping properties is required. For example, by changing the 1,4-proportion to a 1,2-proportion, it is also possible to effect a control of the gas permeability or the diffusion behavior of low-molecular substances in such vulcanized products made from the polymers of this invention. An important example is the oil swelling procedure. Furthermore, the low-temperature properties can be adapted by means of the change in the molecular structure provided by the process of this invention (the freezing temperature varies in a range of about −20° to −100° C., depending on the 1,2-proportion).

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the reduced specific viscosity (RSV) was determined in toluene at 25° C. The distribution of the double bonds of the polymers was determined by infrared absorption spectra.

EXAMPLE 1

At 5° C., 1675 ml. of benzene, 0.2 millimole of cobalt octoate in the form of a benzene solution, 0.2 ml. of water (11.1 mmol) and alternating corresponding amounts of a benzene tris(2-naphthyl)phosphite solution were introduced in the aforementioned sequence into a steel autoclave having a capacity of 5 liters. Thereafter, 250 g. of 1,3-butadiene was introduced. The autoclave was sealed and heated to 25° C. At this temperature, 15 mmol of diethylaluminum chloride was added. The reactor was heated to 50° C. The polymerization was accomplished during a period of 5 hours under agitation. At the end of the polymerization time, the solution was discharged, the catalyst was inactivated with 10 ml. of isopropanol, and the polybutadiene was stabilized by the addition of 2 g. of phenyl-β-naphthylamine. Subsequently, the polymer was obtained by working the reaction mixture up with steam. Table 1 shows the dependence of the structural change in the polymer and of the molecular weight on the rising phosphite concentration. Another experiment (No. 6) was conducted using a higher amount of Co.

TABLE 1

Polymerization Results with the Cobalt Catalyst Modified by Tris(2-naphthyl)-phosphite (T2NPt)

| Experiment No. | P : Co Molar Ratio | Conversion (%) | RSV (dl/g) | Gel (%) | Microstructure (%) trans-1,4 | cis-1,4 | 1,2 |
|---|---|---|---|---|---|---|---|
| 1 | 1 | 76.4 | 1.7 | 36 | 3 | 79 | 18 |
| 2 | 1.25 | 81.7 | 2.4 | 5 | 3 | 83 | 14 |
| 3 | 1.5 | 52.7 | 1.4 | 3 | 4 | 77 | 19 |
| 4 | 3 | 64.0 | 0.36 | 2 | 5 | 41 | 44 |
| 5 | 5 | 14.8 | 0.27 | 3 | 10 | 42 | 48 |
| 6 | 1 (0.3 mmol Co) | 54.0 | 0.90 | <2 | 3 | 76 | 21 |

EXAMPLE 2

The mode of operation described in Example 1 was repeated, except that tris(1-naphthyl)phosphite was employed in place of tris(2-naphthyl)phosphite. The results are complied in Table 2.

TABLE 2

Polymerization Results with the Cobalt Catalyst Modified by Tris (1-naphthyl)phosphite

| Experiment No. | P : Co Molar Ratio | Conversion (%) | RSV (dl/g) | Gel (%) | Microstructure (%) | | |
|---|---|---|---|---|---|---|---|
| | | | | | trans-1,4 | cis-1,4 | 1,2 |
| 7 | 0.5 | 82.8 | 2.5 | 2 | 2 | 82 | 16 |
| 8 | 1 | 64.0 | 1.8 | 3 | 3 | 69 | 28 |
| 9 | 1.5 | 61.8 | 1.1 | <2 | 2 | 48 | 50 |
| 10 | 3 | 60.8 | 0.48 | 3 | 2 | 42 | 56 |

EXAMPLE 3

The mode of operation described in Example 1 was repeated, but with the use of tris(2-chlorophenyl)-phosphite in place of tris(2-naphthyl)phosphite. The results are set forth in Table 3.

TABLE 3

Polymerization Results with the Cobalt Catalyst Modified by Tris(2-chlorophenyl)phosphite

| Experiment No. | P : Co Molar Ratio | Conversion (%) | RSV (dl/g) | Gel (%) | Microstructure (%) | | |
|---|---|---|---|---|---|---|---|
| | | | | | trans-1,4 | cis-1,4 | 1,2 |
| 11 | 1 | 77.5 | 1.4 | 3 | 3 | 63 | 34 |
| 12 | 1.5 | 48.0 | 1.1 | 3 | 3 | 53 | 44 |
| 13 | 3 | 27.6 | 0.42 | 3 | 7 | 43 | 50 |

EXAMPLE 4

The same procedure was followed as set forth in Example 1. In place of tris(2-naphthyl)phosphite, tris-(o-phenylphenyl)phosphite was used (ToPPt). The results are contained in Table 4.

TABLE 4

Polymerization Results with the Cobalt Catalyst Modified by ToPPt

| Experiment No. | P : Co Molar Ratio | Conversion (%) | RSV (dl/g) | Gel (%) | Microstructure (%) | | |
|---|---|---|---|---|---|---|---|
| | | | | | trans-1,4 | cis-1,4 | 1,2 |
| 14 | 0.75 | 72.8 | 2.7 | 5 | 2 | 51 | 47 |
| 15 | 1 | 73.7 | 2.6 | 2 | 3 | 52 | 45 |
| 16 | 1.25 | 70.8 | 2.7 | <2 | 3 | 51 | 46 |
| 17 | 1.5 | 92.5 | 1.7 | <2 | 3 | 32 | 65 |
| 18 | 2 | 80.4 | 1.4 | <2 | 3 | 32 | 65 |
| 19 | 3 | 78.5 | 1.6 | 2 | 2 | 30 | 68 |
| 20 | 5 | 81.5 | 1.2 | <2 | 4 | 32 | 64 |
| 21 | 10 | 76.4 | 1.4 | <2 | 3 | 25 | 72 |
| 22 | 25 | 60.0 | 1.0 | <2 | 1 | 43 | 56 |
| 23 | 50 | 34.0 | 0.78 | <2 | 1 | 36 | 63 |

EXAMPLE 5

The mode of operation set forth in Examples 1 and 4 was repeated, except using other Co compounds in place of cobalt octoate, in part using amounts different from those in Example 1. The results are indicated in Table 5.

TABLE 5

Variation of the Cobalt Catalyst Component

| Experiment No. | Cobalt Compound (mmol) | Et$_2$AlCl (mmol) | ToPPt (mmol) | Conversion (%) | RSV (dl/g) | Gel (%) | Microstructure (%) | | |
|---|---|---|---|---|---|---|---|---|---|
| | | | | | | | trans-1,4 | cis-1,4 | 1,2 |
| 24 | Co$^{II}$acac 0.2 | 40 | 0.3 | 21.6 | 1.2 | <2 | 5 | 59 | 36 |
| 25 | Co$^{II}$ acetate 0.6 | 30 | 0.3 | 30.4 | 1.5 | 2 | 2 | 87 | 11 |
| 26 | DCP-Co 0.2 | 40 (16.65 mmol H$_2$O) | 0.3 | 12.0 | 0.48 | 11 | 9 | 48 | 51 |
| 27 | 0.4 | 40 | 0.2 | 25.6 | 0.70 | 4 | 3 | 62 | 35 |
| 28 | 0.4 | 40 | 0.3 | 34.6 | 0.60 | 4 | 4 | 58 | 38 |
| 29 | Co$^{III}$ acac 0.2 | 15 | 0.2 | 75.8 | 1.1 | 38 | 3 | 58 | 39 |
| 30 | | | 0.3 | 83.8 | 1.4 | <2 | 2 | 33 | 65 |
| 31 | | | 0.4 | 78.8 | 1.4 | <2 | 2 | 36 | 61 |
| 32 | | | 0.6 | 71.0 | 1.6 | <2 | 2 | 34 | 64 |
| 33 | | | 1.0 | 68.8 | 1.1 | <2 | 2 | 31 | 67 |
| 34 | 0.4 | 15 | 0.3 | 46.0 | 0.64 | <2 | 3 | 42 | 55 |

EXAMPLE 6

The procedure of Examples 1 and 4 was repeated, with the modification that the cobalt octoate concentration was varied, with a constant use of phosphite. The results are set forth in Table 6.

TABLE 6

Varying Co Octoate Concentration with Constant Quantities of Phosphite of 0.3 Millimoles of ToPPt

| Experiment No. | Co Oct. (mmol) | P : Co Molar Ratio | Conversion (%) | RSV (dl/g) | Gel (%) | Microstructure (%) | | |
|---|---|---|---|---|---|---|---|---|
| | | | | | | trans-1,4 | cis-1,4 | 1,2 |
| 35 | 0.1 | 3 | 45.6 | 1.9 | 2 | 4 | 59 | 37 |
| 36 | 0.2 | 1.5 | 92.5 | 1.7 | <2 | 3 | 32 | 65 |
| 37 | 0.3 | 1 | 82.1 | 2.0 | <2 | 3 | 36 | 61 |
| 38 | 0.4 | 0.75 | 78.7 | 1.6 | 3 | 3 | 34 | 63 |
| 39 | 0.75 | 0.4 | 71.6 | 1.3 | <2 | 1 | 32 | 67 |
| 40 | 1.0 | 0.3 | 53.2 | 0.79 | 2 | 2 | 35 | 63 |
| 41 | 1.5 | 0.2 | 26.2 | 1.1 | <2 | 2 | 33 | 65 |

EXAMPLE 7

The mode of operation set forth in Examples 1 and 4 was repeated, except that varying monomer concentrations were employed. The experiment proceeded in two directions: On the one hand, the catalyst concentration was kept constant; on the other hand, the catalyst concentration was reduced to one-half, with the use of half the monomer concentration in correspondence therewith. The results are compiled in Table 7.

TABLE 7

Varying Monomer Concentrations;
4.63 Mol of Butadiene (250 g.) 100 %

| Experiment No. | Monomer Conc. (%) | ToPPt (mmol) | Conversion (%) | RSV (dl/g) | Gel (%) | Microstructure (%) trans-1,4 | cis-1,4 | 1,2 |
|---|---|---|---|---|---|---|---|---|
| 42 | 150 | 0.3 | 69.5 | 2.3 | 3 | 3 | 46 | 51 |
| 43 | 100 | 0.3 | 92.5 | 1.7 | <2 | 3 | 32 | 65 |
| 44 | 75 | 0.3 | 79.7 | 1.4 | <2 | 2 | 31 | 67 |
| 45 | 50 | 0.3 | 63.2 | 1.1 | <2 | 3 | 37 | 60 |
| 46 | 25 | 0.3 | 67.7 | 0.60 | <2 | 4 | 35 | 61 |
| 50% Catalyst | | | | | | | | |
| 47 | 50 | 0.075 | 40.8 | 1.3 | <2 | 1 | 44 | 55 |
| 48 | 50 | 0.15 | 26.4 | 1.1 | 2 | 1 | 29 | 70 |

EXAMPLE 8

The process described in Examples 1 and 4 was repeated with the modification that, with a constant P : Co molar ratio of 1.5 : 1, the quantity of various H-acidic compounds was varied. The phosphorus compound employed was tris(o-phenylphenyl)phosphite (0.3 mmol) and the cobalt compound was cobalt octoate (0.2 mmol). The results are indicated in Table 8.

TABLE 8

Varying Concentrations of the H-Acidic Components

| Experiment No. | H-Acidic Compd. (mmol) | Conversion (%) | RSV (dl/g) | Gel (%) | Microstructure (%) trans-1,4 | cis-1,4 | 1,2 |
|---|---|---|---|---|---|---|---|
| 49 | 0 | 16.8 | 0.13 | 2 | 7 | 59 | 34 |
| | H₂O | | | | | | |
| 50 | 2.28 | 22.4 | 0.28 | 3 | 8 | 49 | 43 |
| 51 | 5.55 | 39.6 | 0.71 | <2 | 4 | 36 | 60 |
| 52 | 11.1 | 92.5 | 1.7 | <2 | 3 | 32 | 65 |
| 53 | 13.9 | 55.8 | 1.6 | <2 | 2 | 47 | 51 |
| | Isopropanol | | | | | | |
| 54 | 0.7 | 23.2 | 0.20 | 4 | 7 | 59 | 34 |
| 55 | 1.42 | 26.0 | 0.18 | 2 | 4 | 56 | 40 |
| 56 | 2.85 | 16.9 | 0.14 | 5 | 6 | 53 | 41 |
| 57 | 5.7 | 11.5 | 0.12 | 2 | 7 | 57 | 36 |
| | Trifluoroacetic Acid | | | | | | |
| 58 | 1.38 | 32.2 | 0.25 | 2 | 8 | 55 | 37 |
| 59 | 2.77 | 39.4 | 0.46 | 2 | 6 | 74 | 20 |

EXAMPLE 9

Under the indicated conditions of the experiment (0.2 mmol Co octoate; 0.2 ml. H₂O, 0.3 mmol ToPPt, and 0.6 mmol ToPPt; 1675 ml. benzene, 250 g. 1,3-butadiene; 15.0 mmol diethylaluminum chloride), the effect of the temperature on the polymerization was examined. The reaction time was 5 hours, except for experiment No. 61. The results are shown in Table 9.

TABLE 9

Effect of the Temperature

| Experiment No. | Temp. (°C.) | Conversion (%) | RSV (dl/g) | Gel (%) | Microstructure (%) trans-1,4 | cis-1,4 | 1,2 |
|---|---|---|---|---|---|---|---|
| P:Co = 1.5 (0.3 mmol ToPPt) | | | | | | | |
| 60 | 20 | 30.0 | 3.2 | 2 | 3 | 30 | 67 |
| 61 | 30 | 65.5 | 2.9 | 2 | 1 | 35 | 64 |

TABLE 9-continued

Effect of the Temperature

| Experiment No. | Temp. (°C.) | Conversion (%) | RSV (dl/g) | Gel (%) | Microstructure (%) trans-1,4 | cis-1,4 | 1,2 |
|---|---|---|---|---|---|---|---|
| P:Co = 1.5 (0.3 mmol ToPPt) | | | | | | | |
| (3 h Reaction Time) | | | | | | | |
| 62 | 40 | 55.2 | 2.0 | <2 | 4 | 38 | 58 |
| 63 | 50 | 92.5 | 1.7 | <2 | 3 | 32 | 65 |
| 64 | 60 | 78.0 | 1.5 | <2 | 3 | 40 | 57 |
| 65 | 70 | 61.0 | 1.3 | <2 | 7 | 37 | 56 |
| 66 | 80 | 56.8 | 1.1 | <2 | 4 | 52 | 44 |
| P:Co = 3:1 (0.6 mmol ToPPt) | | | | | | | |
| 67 | 0 | 8.0 | 3.2 | 3 | 2 | 27 | 71 |
| 68 | 20 | 62.0 | 3.1 | <2 | 2 | 29 | 69 |
| 69 | 30 | 60.0 | 1.9 | <2 | 2 | 37 | 61 |
| 70 | 40 | 61.6 | 1.7 | <2 | 2 | 36 | 62 |
| 71 | 50 | 72.4 | 1.5 | <2 | 2 | 39 | 59 |
| 72 | 60 | 51.6 | 1.4 | <2 | 3 | 50 | 47 |
| 73 | 70 | 60.0 | 1.4 | <2 | 3 | 53 | 44 |
| 74 | 80 | 46.1 | 1.2 | 2 | 3 | 50 | 47 |

EXAMPLE 10

The course of the polymerization with respect to time was investigated, with otherwise constant experimental conditions as set forth in Example 9. The temperature was 50° C. Table 10 contains the results.

TABLE 10

| Experiment No. | t (min.) | Conversion (%) | RSV (dl/g) | Gel (%) | Microstructure (%) trans-1,4 | cis-1,4 | 1,2 |
|---|---|---|---|---|---|---|---|
| 75 | 3 | 17.2 | 0.76 | 9 | 7 | 36 | 57 |
| 76 | 5 | 29.2 | 0.98 | 6 | 6 | 36 | 58 |
| 77 | 10 | 48.0 | 1.7 | <2 | 2 | 38 | 60 |
| 78 | 20 | 64.8 | 1.6 | <2 | 2 | 35 | 63 |
| 79 | 30 | 64.0 | 1.6 | <2 | 2 | 30 | 68 |
| 80 | 45 | 64.1 | 1.6 | <2 | 4 | 39 | 57 |
| 81 | 60 | 66.4 | 1.6 | <2 | 3 | 39 | 58 |
| 82 | 180 | 74.6 | 2.0 | <2 | 5 | 33 | 62 |
| 83 | 300 | 92.5 | 1.7 | <2 | 3 | 32 | 65 |

EXAMPLE 11

The mode of operation disclosed in Examples 1 and 4 was repeated — except for experiments Nos. 97, 98, and 99 (see column 2 of Table 11)—with the modification that other solvents were used in place of benzene. The results are compiled in Table 11. The phosphite employed was tris(o-phenylphenyl)phosphite.

TABLE 11

Polymerization in Various Solvents

| Experiment No. | P:Co Molar Ratio | Conversion (%) | RSV (dl/g) | Gel (%) | Microstructure (%) trans-1,4 | cis-1,4 | 1,2 |
|---|---|---|---|---|---|---|---|
| Toluene | | | | | | | |
| 84 | 1 | 61.6 | 1.1 | 15 | 2 | 29 | 69 |
| 85 | 1.5 | 66.4 | 1.1 | <2 | 1 | 32 | 67 |
| 86 | 3 | 60.8 | 0.85 | <2 | 1 | 31 | 68 |
| 87 | 5 | 42.3 | 0.70 | <2 | 2 | 32 | 66 |
| Hexane | | | | | | | |
| 88 | 1 | 24.8 | 1.7 | 40 | 4 | 33 | 63 |
| 89 | 1.5 | 21.8 | 0.65 | 2 | 4 | 30 | 66 |
| 90 | 3 | 24.0 | 0.41 | <2 | 1 | 32 | 67 |
| 91 | 5 | 16.8 | 0.35 | 2 | 2 | 31 | 67 |
| Cyclohexane | | | | | | | |
| 92 | 1 | 12.0 | 0.31 | 5 | 5 | 39 | 56 |
| 93 | 1.5 | 14.4 | 0.20 | 4 | 3 | 34 | 63 |
| Chlorobenzene | | | | | | | |
| 94 | 1.5 | 16.0 | 0.43 | <2 | 2 | 27 | 71 |
| 95 | 3 | 60.6 | 1.7 | <2 | 2 | 27 | 71 |
| 96 | 5 | 46.0 | 1.2 | <2 | 1 | 25 | 74 |
| 97 | 0.75 | 37.5 | 0.5 | <2 | 1 | 28 | 71 |
| (with 0.4 mmol | | | | | | | |

TABLE 11-continued

| Experiment No. | P:Co Molar Ratio | Polymerization in Various Solvents | | | | | |
|---|---|---|---|---|---|---|---|
| | | Conversion (%) | RSV (dl/g) | Gel (%) | Microstructure (%) | | |
| | | | | | trans-1,4 | cis-1,4 | 1,2 |
| Co octoate) Methylene chloride | | | | | | | |
| 98 (4 min. reaction time) | 1.0 | 31.2 | 2.1 | <2 | 2 | 72 | 26 |
| 99 (2 h. reaction time) | 1.5 | 66.8 | 2.6 | 10 | 2 | 43 | 55 |
| 100 | 2 | 86.0 | 1.4 | <2 | 1 | 21 | 78 |
| 101 | 3 | 81.2 | 1.4 | 2 | 1 | 20 | 79 |
| 102 | 5 | 49.6 | 1.4 | <2. | 1 | 16 | 83 |

EXAMPLE 12

In place of 1,3-butadiene, equal amounts of isoprene were polymerized according to the method of Examples 1 and 4. Table 12 shows the results

TABLE 12

| Experiment No. | CoOct. (mmol) | ToPPt (mmol) | Et₂AlCl (mmol) | Conversion (%) | RSV (dl/g) | Gel (%) | Microstructure (%) | | |
|---|---|---|---|---|---|---|---|---|---|
| | | | | | | | 1,2 | 3,4 | 1,4 |
| Isoprene | | | | | | | | | |
| 103 | 0.1 | 0.2 | 15 | 16.0 | 0.06 | 9 | 10 | 20 | 70 |
| 104 | 0.2 | 0.2 | 15 | 26.0 | 0.61 | 8 | 4 | 26 | 70 |
| 105 | 0.4 | 0.2 | 15 | 24.0 | 0.27 | 5 | 8 | 39 | 59 |
| 106 | 0.2 | 0.3 | 15 | 24.8 | 0.80 | 11 | 9 | 29 | 62 |
| 107 | 0.2 | 0.6 | 15 | 16.4 | 0.37 | 7 | 11 | 42 | 47 |

EXAMPLE 13

The mode of operation of Examples 1 and 4 was repeated with the modification that, with otherwise constant conditions (ToPPt : Co = 1.5 : 1; 0.2 mmol Co octoate), the amount of diethylaluminum chloride was varied. Table 13 demonstrates the results.

TABLE 13

| Experiment No. | Et₂AlCl (mmol) | Et₂AlCl Concentration | | | | | |
|---|---|---|---|---|---|---|---|
| | | Conversion (%) | RSV (dl/g) | Gel (%) | Microstructure (%) | | |
| | | | | | trans-1,4 | cis-1,4 | 1,2 |
| 108 | 10 | 4.7 | 1.1 | 9 | 7 | 29 | 64 |
| 109 | 15 | 92.5 | 1.7 | <2 | 3 | 32 | 65 |
| 110 | 20 | 67.0 | 1.4 | <2 | 4 | 39 | 57 |
| 111 | 30 | 56.6 | 0.97 | <2 | 3 | 44 | 53 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a vinyl-group containing unsaturated hydrocarbon polymer by the polymerization of a conjugated diene in the presence of a solvent, employing as catalyst system consisting essentially of (a) one or both of cobalt octoate and cobalt acetylacetonate, (b) a halogen-containing organoaluminum compound in an amount such that the molar ratio of the cobalt in (a) to the aluminum in (b) is 1:1 to 1:2,000, and (c) an organic phosphorus compound, alone or in combination with (d) an H-acidic compound in a molar ratio to the aluminum in (b) of up to 1.5 : 1, the improvement wherein component (c) is a tris(aryl)phosphite of the general formula

wherein $R_1$, $R_2$ and $R_3$ are monocyclic halogenated aryl or diphenyl, naphthyl, anthracenyl or phenanthryl, or a corresponding diphenyl, naphthyl, anthracenyl or phenanthryl substituted by at least one of halo and alkyl, in a molar ratio of from 0.1 to 50 moles per mole of cobalt compound.

2. A process according to claim 1 wherein the catalyst system contains an H-acidic compound.

3. A process according to claim 2 wherein the acidic compound is a bronsted acid or an alcohol.

4. A process according to claim 2 wherein the H-acidic compound is water.

5. A process according to claim 1 wherein the tris-(aryl)phosphite is tris(o-phenylphenyl)phosphite.

6. A process according to claim 1 wherein the tris-(aryl)phosphite is tris-1- or tris-2-naphthylphosphite.

7. A process according to claim 1 wherein the tris-(aryl)phosphite is tris(o-chlorophenyl)phosphite.

8. A process according to claim 1 wherein (a) is cobalt octoate.

9. A process according to claim 1 wherein the halogen-containing organoaluminum compound is dimethylaluminum chloride, diethylaluminum chloride or diisobutylaluminum chloride.

10. A process according to claim 1 wherein the conjugated diene is butadiene or isoprene.

11. A process according to claim 1 wherein the catalyst system is
   a. one or both of cobalt octoate and cobalt acetylacetonate,
   b. diethylaluminum chloride,
   c. tris(o-phenylphenyl) phosphite, tris-1- or tris-2-naphthyl phosphite or tris(o-chlorophenyl) phosphite, and
   d. water.

12. A process according to claim 11 wherein the conjugated diene is butadiene or isoprene.

13. A catalyst system for polymerizing conjugated dienes consisting essentially of
   a. one or both of cobalt octoate and cobalt acetylacetonate;

b. a halogen-containing organoaluminum compound in an amount such that the molar ratio of the cobalt in (a) to the aluminum in (b) is 1:1 to 1:2,000;

c. a phosphite of the general formula

wherein $R_1$, $R_2$ and $R_3$ are monocyclic halogenated aryl or diphenyl, naphthyl, anthracenyl or phenanthryl, or a corresponding diphenyl, naphthyl, anthracenyl or phenanthryl substituted by at least one of halo and alkyl, in a molar ratio of from 0.1 to 50 moles per mole of cobalt compound, alone or in combination with (d), an H-acidic compound in a molar ratio to the aluminum in (b) of up to 1.5 : 1.

* * * * *